United States Patent Office

2,909,552
Patented Oct. 20, 1959

2,909,552

PROCESS FOR THE PREPARATION OF ALKOXY AND ARALKOXY-METHYLPOLYSILOXANES

Pierre Jean Chevalier, Lyon, France, assignor to Societe des Usines Chimiques Rhone-Poulenc, Paris, France, a French body corporate No Drawing. Application July 1, 1957
Serial No. 668,912

Claims priority, application France July 13, 1956

4 Claims. (Cl. 260—448.8)

The present invention relates to a process for the preparation of methylpolysiloxanes in which alkoxy or aralkoxy groups are directly attached to silicon atoms in Si—O—Si linkages. In this specification the term "alkoxy" is to be understood to cover both alkoxy and aralkoxy groups.

It has already been proposed to prepare polysiloxanes of the aforesaid type by partially hydrolysing alkyltrialkoxysilanes, obtained, for example, by the action of an alkylmagnesium halide on an alkylorthosilicate such as ethyl orthosilicate. By this method there is obtained a wide range of different products which are difficult to separate from one another.

Moreover, it has been proposed to prepare alkoxyorganopolysiloxanes by reacting organopolysiloxanes containing silicon-hydrogen linkages with compounds containing hydroxyl groups, for example mono- or poly-alcohols. In this case, the reaction involves the evolution of hydrogen derived both from the Si—H group and from the —OH radical of the organic compound. The volume of hydrogen evolved is considerable and often troublesome, and makes it necessary for certain precautions to be taken.

According to the present invention a process for the production of alkoxymethylpolysiloxanes comprises reacting a methylpolysiloxane containing silicon-hydrogen linkages with an oxygen-containing organic compound free from hydroxyl groups but containing a carbonyl group. Replacement in the known method referred to in the preceding paragraph of a compound containing a hydroxyl group by a compound containing a carbonyl group should theoretically have the effect of completely suppressing the evolution of hydrogen and, in fact, it reduces it considerably.

When the compound containing a carbonyl group is an aldehyde RCHO, the alkoxy group on the resultant polysiloxane is in the form —OCH$_2$R. If the compound containing a carbonyl group is a ketone RCOR', the alkoxy group on the resultant polysiloxane is in the form —OCHRR'. If the compound containing a carbonyl group is an ester RCOOR', radicals —OCH$_2$R and radicals —OR' are simultaneously attached to the methylpolysiloxane.

In carrying out the process it is often advantageous to work at the reflux temperature of the reactants. This is a convenient way of controlling the reaction, which is exothermic. Advantageously one of the reactants may be progressively added to the other and it is sometimes desirable to dilute the products with an anhydrous solvent, for example, xylene.

Generally, it is preferred to carry out the reaction in the presence of small quantities of a catalyst. For this purpose, metals (for example, zinc) or metal oxides, salts of organic acids (cobalt acetate, zinc octoate) and titanium derivatives (butyl titanate) are particularly suitable.

The alkoxymethylpolysiloxanes prepared by the process according to the invention may be used for a variety of purposes, inter alia as water-proofing agents for textiles or ceramics, as lubricants, as cosmetics and as additives for polishes.

The following examples will serve to illustrate the invention.

Example I 64 g. of benzaldehyde and 1 g. of zinc powder are placed in a spherical flask provided with a reflux condenser and with a thermometer. The mixture is heated to about 178° C., which is the reflux temperature of the benzaldehyde, and 36 g. of methylhydrogenopolysiloxanes having a viscosity of 12 cst. at 20° C. are run in over a period of 40 minutes. Heating is continued and the temperature rises regularly in a manner proportional to the removal of benzaldehyde, and finally reaches 250° C.

The zinc is filtered off and 96 g. of a liquid having a density at 20° C. of 1.152 and a refractive index $n_D^{20}$ of 1.520 is obtained.

Specific refraction: 0.264 (calculated for a methylbenzyloxypolysiloxane: 0.264).

When treated with a 50% solution of hot aqueous potassium hydroxide the product forms two layers: a lower aqueous layer consisting of potassium methylsiliconate and an organic layer from which, on distillation, benzyl alcohol (boiling point 204° C.; $n_D^{20}=1.541$) may be isolated.

The percentage of hydrogen present in the form of Si—H linkages in the reaction product is determined by means of a 30% sodium hydroxide solution. The value found, 0.005%, shows that the product obtained is substantially free from Si—H linkages and is methylbenzyloxypolysiloxanes.

Example II

Into the apparatus employed in Example I are introduced 45 g. of dipropyl ketone, 23.5 g. of methylhydrogenopolysiloxane and 0.7 g. of zinc powder. The mixture is heated under reflux for eight hours. The temperature rises progressively and finally reaches 200° C.

The liquid thus obtained has a density at 20° C. of 0.958, a refractive index $n_D^{20}$ of 1.4300 and specific refraction 0.270 (calculated 0.271). The percentage of hydrogen in the form of Si—H linkages is 0.003.

On treatment of the liquid with 50% potassium hydroxide, two layers are obtained, the organic layer having the following characteristics: $d_4^{20}=0.830$; $n_D^{20}$—1.4212; specific refraction 0.306 (calculated 0.310).

On treating the organic layer with 3:5-dinitrobenzoylchloride in the presence of pyridine and benzene by the method described by M. Pesez and P. Poirier in "Methodes et Reactions de l'Analyse Organique" [Masson (1952), vol. II, page 54], there is obtained a white solid which, after recrystallization from petroleum-ether, has a melting point of 64° C. This melting point agrees with that given by Samuel M. Elvain in "The Characterisation of Organic Compounds," [Macmillan Co., New York (1946), page 194], for the 3:5-dinitrobenzoate of di(n-propyl)-carbinol.

Example III

Into the apparatus employed in Example I are introduced 60 g. of methyl hydrogenopolysiloxane (viscosity at 20° C.: 12 cst.), 58 g. of butyl acetate and 1.2 g. of zinc powder, and the mixture is heated for 30 hours between 130° and 135° C.

After filtration, 116 g. of a liquid having the following physical constants is obtained: viscosity at 20° C.: 13 cst.; $d_4^{20}=1.017$; $n_D^{20}=1.4122$; specific refraction: 0.246 (calculated for an ethoxybutoxymethylpolysiloxane: 0.245).

When treated with 50% aqueous potash a mixture of ethyl and butyl alcohols is obtained.

The percentage of hydrogen present in the form of Si—H linkages in the ethoxybutoxymethylpolysiloxane is 0.04%.

*Example IV*

Into the apparatus employed in Example I are introduced 60 g. of methylhydrogenopolysiloxane, 59 g. of monomethylglycolmonoacetate and 1.2 g. of butyl titanate, and the mixture is heated for 14 hours at about 130° C.

A limpid liquid is obtained which has the following physical characteristics: $d_4^{20}=1.098$; $n_D^{20}=1.4190$; specific refraction: 0.230 (calculated for an ethoxy(2-methoxyethoxy)methylpolysiloxane: 0.231).

The percentage of hydrogen present in the form of Si—H linkages in the product obtained is 0.01%.

*Example V*

A mixture of 43 g. of methylhydrogenopolysiloxane, 57 g. of methylcaprylate and 1 g. of zinc powder is heated for 1 hour at 180° C. to 220° C. in the apparatus described in Example I. The mixture is filtered, and a liquid having the following physical characteristics is obtained; $d_4^{20}=1.003$; $n_D^{20}=1.4277$; specific refraction: 0.256 (calculated for a methoxyoctyloxymethylpolysiloxane: 0.257).

The percentage of hydrogen in the form of Si—H linkages in the product is less than 0.005%.

I claim:

1. A process for the production of methyl alkoxypolysiloxanes which comprises reacting a methylpolysiloxane containing silicon-hydrogen linkages with a compound which is free from hydroxyl groups and is selected from the class consisting of saturated and aromatic monoaldehydes, mono-ketones and mono-esters, in the presence of a catalyst selected from the class consisting of butyl titanate and zinc.

2. Process according to claim 1 wherein one of the reactants is added to the other during the course of the reaction.

3. Process according to claim 1 wherein the catalyst is zinc powder.

4. Process according to claim 1 wherein the catalyst is butyl titanate.

References Cited in the file of this patent

UNITED STATES PATENTS

| | | |
|---|---|---|
| 2,658,908 | Nitzsche et al. | Nov. 10, 1953 |
| 2,721,873 | MacKenzie et al. | Oct. 25, 1955 |

FOREIGN PATENTS

| | | |
|---|---|---|
| 730,379 | Great Britain | May 25, 1955 |
| 1,037,037 | France | Apr. 29, 1953 |
| 1,054,055 | France | Oct. 7, 1953 |
| 1,074,538 | France | Apr. 7, 1954 |